US011650086B2

(12) United States Patent
Loeken et al.

(10) Patent No.: US 11,650,086 B2
(45) Date of Patent: May 16, 2023

(54) METHOD FOR CALIBRATING A ROTARY ENCODER, AND ROTARY ENCODER

(71) Applicant: FRABA B.V., Sg Heerlen (NL)

(72) Inventors: Michael Loeken, Juelich (DE); Uwe Kettering, Cologne (DE)

(73) Assignee: FRABA B.V., Sg Heerlen (NL)

( * ) Notice: Subject to any disclaimer, the term of this patent is extended or adjusted under 35 U.S.C. 154(b) by 1052 days.

(21) Appl. No.: 16/326,711

(22) PCT Filed: Aug. 15, 2017

(86) PCT No.: PCT/EP2017/070648
§ 371 (c)(1),
(2) Date: Feb. 20, 2019

(87) PCT Pub. No.: WO2018/036862
PCT Pub. Date: Mar. 1, 2018

(65) Prior Publication Data
US 2021/0285802 A1 Sep. 16, 2021

(30) Foreign Application Priority Data
Aug. 23, 2016 (DE) ...................... 10 2016 115 624.8

(51) Int. Cl.
*G01D 18/00* (2006.01)
(52) U.S. Cl.
CPC .................. *G01D 18/001* (2021.05)
(58) Field of Classification Search
CPC .... G01D 18/00; G01D 18/001; G01D 18/008; G01D 3/028; G01D 3/032; G01D 3/036;
(Continued)

(56) References Cited

U.S. PATENT DOCUMENTS

| 6,198,275 B1* | 3/2001 | Wolf | G01D 3/0365 |
| | | | 324/225 |
| 2004/0189285 A1* | 9/2004 | Uenoyama | G01D 18/001 |
| | | | 324/207.21 |

(Continued)

FOREIGN PATENT DOCUMENTS

DE 10 2013 204 581 A1 9/2014
DE 10 2016 101 965 A1 8/2017
(Continued)

OTHER PUBLICATIONS

Koninklijke Philips Electronics: "KMA200, Programmable angle sensor", Product Data Sheet, Rev. 05, , pp. 1-31, Internet Citation http://web.archive.org/web/20061116234248/http://www.nxp.com/acrobat_download/datasheets/KMA200_5.pdf (Aug. 16, 2005).

*Primary Examiner* — Steven L Yeninas
(74) *Attorney, Agent, or Firm* — Norman B. Thot (57) ABSTRACT

A method for calibrating a rotary encoder for capturing rotational angle position of a machine shaft. The rotary encoder includes an exciter unit which is rotationally fixed to the machine shaft, and a stationary sensor unit which interacts therewith. The method includes rotating the machine shaft to perform a rotational movement at a predefined rotational speed at a first sensor temperature, capturing a first position measured value at a first predefined rotational angle position at the first sensor temperature, heating or cooling the sensor unit to a second sensor temperature, capturing a second position measured value at the first predefined rotational angle position at the second sensor temperature, determining a first deviation between at least the second position measured value and a first desired position measured value, and correcting an output signal from the rotary encoder via the first deviation.

7 Claims, 3 Drawing Sheets

(58) Field of Classification Search
CPC .............. G01D 3/0365; G01R 33/0082; G01R 33/007; G01B 5/0014
See application file for complete search history.

(56) References Cited

U.S. PATENT DOCUMENTS

| | | |
|---|---|---|
| 2005/0028614 A1 | 2/2005 | Saito |
| 2006/0164075 A1* | 7/2006 | Niwa .................... G01D 5/2013 324/207.16 |
| 2008/0117992 A1* | 5/2008 | Murokita ............. G01D 18/001 375/250 |
| 2010/0312514 A1* | 12/2010 | Bonato .................. G01D 5/145 702/104 |
| 2014/0039829 A1* | 2/2014 | Kubota ................ G01D 3/0365 702/151 |
| 2014/0266176 A1* | 9/2014 | Fernandez ........... G01D 5/2449 324/244 |
| 2016/0018207 A1 | 1/2016 | Fuchs et al. |

FOREIGN PATENT DOCUMENTS

| | | |
|---|---|---|
| JP | 2002-195822 A | 7/2002 |
| JP | 2005-55297 A | 3/2005 |
| JP | 2006-30217 A | 2/2006 |

\* cited by examiner

METHOD FOR CALIBRATING A ROTARY ENCODER, AND ROTARY ENCODER

CROSS REFERENCE TO PRIOR APPLICATIONS

This application is a U.S. National Phase application under 35 U.S.C. § 371 of International Application No. PCT/EP2017/070648, filed on Aug. 15, 2017 and which claims benefit to German Patent Application No. 10 2016 115 624.8, filed on Aug. 23, 2016. The International Application was published in German on Mar. 1, 2018 as WO 2018/036862 A1 under PCT Article 21(2).

FIELD

The present invention relates to a method for calibrating a rotary encoder for capturing a rotational angle position of a machine shaft, wherein the rotary encoder comprises at least one exciter unit connected to the machine shaft in a rotational fixed manner and a stationary sensor unit functionally interacting with the exciter unit. The present invention also relates to a rotary encoder for determining a corrected rotational angle position.

BACKGROUND

The information about a current position of a machine shaft is vital for precisely operating a machine. Such positional information play an important part, for example, in the automation of plants, in particular for controlling technically, in most cases, high-precision processes. Systems for position detection are thus always required to control, for example, a machine tool, a robot arm or similar applications. Such systems are also required for speed or position control for electric motors, in particular for supplying information about the location where the rotor is located for the purpose of controlling the coils.

Incremental rotary encoders serve to capture positional changes and may be employed to measure a distance, a direction, or an angular change. Such incremental encoders only allow a relative position within the scale division or a bar code to be captured. Capturing of a specific number of passed scale divisions is required to determine an absolute position.

Absolute rotary encoders can directly determine the absolute position of a machine shaft. This is in most cases performed via a coded scanning which is respectively clearly associated with a specific angle position of the shaft.

A particularly exact positioning as well as a calibration of the measuring system is required to provide a measuring accuracy which is as high as possible, in particular of the sensor unit relative to the exciter unit. It has turned out that the temperature prevailing at the sensor unit, in particular a temperature change, may affect the measuring accuracy of the measuring system. Such temperature changes may regularly be caused by external environmental influences, such as solar radiation, by the operation of a machine, or by the electronic system of the rotary encoder during operation of the rotary encoder.

In the case of a rotational angle sensor calibrated at room temperature, for example, a deviation of a captured position value from an actual position value or a position value calibrated at room temperature of a rotational angle position may occur when an increased ambient temperature, for example, a temperature of 100° C., prevails. The reason for such a temperature-dependent deviation, which is also referred to as "temperature drift", at an increased temperature may, for example, be an expansion of the materials used at the rotary encoder or a machine and/or a positional change of the components oriented towards each other for measuring purposes. The latter may in particular apply to the components normally arranged in the sensor unit, such as a Hall sensor, an AMR basic sensor, an optical sensor, a signal amplifier and/or an A/D converter. The faulty detection of an angle position when using, for example, the rotary encoder for controlling a drive motor, may thus result in deviations in the true running in the motor and/or an error in the positioning of a component, such as a robot arm.

SUMMARY

An aspect of the present invention is to provide a method for calibrating a rotary encoder where, with a relatively small effort, a particularly high measuring accuracy can be attained even at changed ambient and/or sensor temperatures.

In an embodiment, the present invention provides a method for calibrating a rotary encoder for capturing a predefined rotational angle position of a machine shaft. The rotary encoder includes at least one exciter unit connected to the machine shaft in a rotationally fixed manner, and a stationary sensor unit which is configured to functionally interact with the exciter unit. The method includes rotating the machine shaft so as to perform a rotational movement at a predefined rotational speed at a first sensor temperature, capturing a first position measured value at a first predefined rotational angle position at the first sensor temperature, heating or cooling at least the stationary sensor unit to a second sensor temperature which is higher or lower than the first sensor temperature, capturing a second position measured value at the first predefined rotational angle position at the second sensor temperature, determining a first deviation between at least the second position measured value and a first desired position measured value, and correcting an output signal from the rotary encoder via the first deviation determined at the first predefined rotational angle position at the second sensor temperature.

BRIEF DESCRIPTION OF THE DRAWINGS

The present invention is described in greater detail below on the basis of embodiments and of the drawings in which.

DETAILED DESCRIPTION

The method according to the present invention for calibrating a rotary encoder for capturing a rotational angle position of a machine shaft, in particular an absolute-value encoder, comprises the following steps:

Causing the machine shaft to perform a rotational movement at a predefined rotational speed, in particular at a constant rotational speed, when a first sensor temperature prevails. The first sensor temperature can, for example, correspond to the room temperature, that is approximately 21° C. The rotational speed can be predefined by the rotary encoder itself at a drive motor or at a control electronic system. A rotational speed of approximately 1000 revolutions per minute may be provided, for example, for this purpose.

A first position measured value at a predefined rotational angle position is automatically captured with the aid of the sensor unit when the first sensor temperature, in particular the room temperature, prevails. The captured first position value corresponds to a value depending on the first temperature as well as the rotational angle. The predefined rotational angle position may, for example, be a measuring point defined at a machine shaft, a so-called "zero crossing" of the machine shaft. Capturing of the first position measured value at the predefined rotational angle position may essentially correspond to a known conventional calibration method for a rotary encoder. It is also possible, by concatenating captured measured values, for example, to capture an angle progression produced during a revolution of the machine shaft at the first sensor temperature.

The active temperature calibration is performed after the first position measured value at the first sensor temperature has been captured. The sensor temperature prevailing at the sensor unit is changed for this purpose, in particular, the sensor unit is heated or cooled to a second sensor temperature which is higher or lower than the first sensor temperature. The overall rotational angle measuring system can generally be set for this purpose, for example, to a defined temperature in a climate chamber or the like. Only a local heating or cooling of individual components of the rotational angle measuring system can, for example, be performed, which is considerably more effective and inexpensive. The sensor unit can in particular be locally heated or cooled so that only the temperature of individual areas or components of the sensor unit is changed or said areas or components have the second sensor temperature. The conditions prevailing at the rotary encoder during operation can thereby be emulated in a particularly realistic manner. Only a microcontroller of the rotary encoder, which is normally relatively quickly heated due to its mode of operation can, for example, be set to a second sensor temperature. Heating or cooling may be performed with the aid of an external device, i.e., a device independent of the rotary encoder, for example, with the aid of a hot air gun, laser, infrared radiator, venting system, cooling pad or the like. The machine shaft may generally be stopped and then again be set in a rotational movement to heat or cool the sensor unit. The rotational speed of the machine shaft is advantageously kept constant during the heating or cooling of the sensor unit so that the effort and time for the calibration are kept relatively low and the operating conditions of the rotary encoder can be emulated in a particularly realistic manner.

When the second sensor temperature has been reached, the second position measured value is again captured at the rotational angle position when the second sensor temperature prevails. The captured second position value corresponds to a value depending on the second temperature as well as the rotational angle. The rotational angle positions of the first measurement at room temperature and the second measurement at a changed temperature may generally differ from each other. The rotational angle positions can, for example, be at the same location on the machine shaft so that the capturing of the first position measured value and the second position measured value is respectively performed at the same rotational angle position. During the capturing process, the second sensor temperature is advantageously kept constant at the sensor unit. The capturing is again performed by the conventional method, wherein it is again generally possible not only to carry out an individual-value measurement per degree and revolution but to capture an angle progression produced across the overall revolution of the machine shaft.

A deviation at least between the captured second position measured value and a predefined desired position measured value is determined. A difference between the second position measured value and a desired position measured value is in particular arithmetically determined, wherein the determined difference corresponds to a value depending on the temperature deviation and the rotational angle. A calculation module may be activated for this purpose, wherein the predefined desired position measured value can be retrievably stored in a storage module. The desired position measured value indicates that measured value which is adapted to be captured exactly at a defined rotational angle position in the ideal case. An "ideal" position can thereby be indicated. The deviation is consequently to be understood as a deviation of the measured angular position from the above-mentioned ideal angular position of the machine shaft. A correction value can be directly determined on the basis of the deviation by which a position measured value must be corrected when the corresponding temperature prevails.

In a next step, an output signal of the rotary encoder is therefore corrected by the determined deviation or by the correction value at the respective rotational angle position when the second sensor temperature prevails. Each individual angle value from 0° to 360° is advantageously corrected per revolution according to a sensor temperature prevailing at the sensor unit. Even at a sensor temperature deviating from the room temperature, the rotational angle position of the machine shaft can thereby be exactly determined by the rotary encoder so that a control and/or positioning of in particular a drive motor can be performed in a particularly exact manner.

The method described above can, for example, be performed at at least two rotational angle positions per revolution of the machine shaft. A respective first position measured value can in particular be captured during a revolution of the machine shaft at at least two predefined rotational angle positions when the first sensor temperature prevails, and after heating or cooling of the sensor unit to a second sensor temperature, a respective second position measured value can be captured during another revolution of the machine shaft at the rotational angle positions when the second sensor temperature prevails, and then a respective deviation of the second position measured value from a desired position measured value can be determined. The output signal of the rotary encoder can subsequently be corrected by the determined deviation at the respective rotational angle positions when the second sensor temperature prevails. The method can, for example, be performed for each rotational angle position distributed over 360° on the machine shaft, advantageously during a single revolution of the machine shaft. The deviation across the revolution can alternatively or additionally also be approximately calculated by a mathematical algorithm for verification purposes. The rotary encoder can thereby be calibrated in a particularly exact manner across the entire circumference of the machine shaft. The calibration can also be performed in a relatively short time.

At least a third position measured value can, for example, be additionally calculated which is to be expected at the rotational angle position when a third sensor temperature prevails. The third sensor temperature may generally have any value deviating from the first and the second sensor temperature. The third temperature can, for example, have a value ranging between the first temperature and the second temperature. The measured value to be expected can in particular be calculated by interpolating the known measured value at the first and the second temperature. Measured values to be expected can alternatively be calculated in particular by interpolation even outside the measured temperature interval. An interpolation or extrapolation can in particular be performed on position measured values between two entries into the correction table and at temperatures between the first calibration temperature (e.g., room temperature) and the second compensation temperature (e.g., 100° C.). A deviation between the calculated third position measured value and the desired position measured value can be determined on this basis and the output signal of the rotary encoder can be corrected by the determined deviation at the rotational angle position when the third sensor temperature prevails. An angle progression of the machine shaft can thereby be calculated and used for correcting the measured values for any temperature ranging between the first temperature and the second temperature.

The desired position measured value used for calculation can, for example, be defined by the captured first position measured value. The first position measured value can thus correspond to a desired position measured value and can, for example, represent a value adapted to be captured at room temperature, which can be considered an ideal reference value. The first position measured value can be retrievably saved in a storage for this purpose and be used to determine the deviation.

The desired position measured value can, for example, be determined with the aid of a reference value encoder or with the aid of an incremented time value corresponding to a predefined time span of the rotational movement from the first rotational angle position to the second rotational angle position. Such a method is described in detail in DE 10 2016 101 965.8. Each rotary encoder can thereby be individually calibrated in a particularly exact manner. The calibration can also be performed with a reference value encoder or automatically.

At least one position measured value and/or the deviation can, for example, be stored in a storage. All captured position measured values and/or calculated deviations can, for example, be stored in the storage and can be used to operate and correct the rotary encoder. The position measured values and/or deviation values for different temperatures, in particular temperatures to be expected, can, for example, be saved in the storage. A correction table, the temperature-dependent angle progression and/or at least a correction value can also be stored. A particularly high measurement accuracy and rotational angle determination of the rotary encoder can thereby be provided for each temperature to be expected.

The sensor temperature is advantageously continuously captured during operation of the rotary encoder. The rotary encoder itself, independent of other components, can thereby continuously capture the sensor temperature and employ a correction value corresponding to the sensor temperature for a specific rotational angle position. A particularly high measuring accuracy and rotational angle determination can thereby be provided for each temperature to be expected.

The rotary encoder according to the present invention for determining a corrected rotational angle position of a machine shaft, in particular an absolute-value encoder, comprises at least one exciter unit connected to the machine shaft in a rotationally fixed manner and a stationary sensor unit functionally interacting with the exciter unit, in particular a Hall sensor and a microcontroller. For a temperature-dependent calibration as well as determination of a rotational angle position corrected by a temperature deviation, the rotary encoder additionally comprises, according to the present invention, a temperature sensor. The rotary encoder can thus in particular be arranged for execution of the above-described method. The rotary encoder may optionally comprise a temperature evaluation module for evaluating the temperature prevailing at the sensor unit for this purpose. The temperature evaluation module may, for example, be integrated in the microcontroller. The rotary encoder can consequently autonomously perform a temperature-dependent calibration for a temperature-compensated determination of the rotational angle positions. During operation of the rotary encoder, the sensor temperature can also be continuously captured and a corresponding correction value for the respective rotational angle position can be automatically employed. A rotary encoder can thereby be provided which provides a particularly precise indication of the rotational angle position independent of the ambient and/or the sensor temperature.

The rotary encoder can, for example, comprise a storage module for storing at least one position measured value and/or deviation. The storage can, for example, be integrated in the rotary encoder so that the number of components may be relatively small. The calculation and correction of the captured values can thereby be performed at the respective temperature directly at the rotary encoder so that a separate evaluation means is not required.

The rotary encoder can, for example, comprise a calculation module for calculating at least one position measured value and/or deviation between a position measured value and a desired position measured value for at least one predefined sensor temperature. The calculation and correction of the captured values can thereby be performed at a respective temperature directly at the rotary encoder so that a separate evaluation means is not required.

The rotary encoder can, for example, comprise a heating and/or cooling device for actively heating or cooling at least an area of the rotary encoder. A temperature-dependent calibration can thereby be performed autonomously by the rotary encoder independent of external devices. This is in particular advantageous when a regular calibration is carried out. The heating and/or cooling device can, for example, be deactivated during the operation of the rotary encoder.

The heating and/or cooling device can comprise at least one electric wire for heating the sensor unit, which wire generates heat when current is applied thereto. The sensor unit can thereby be heated to a specific temperature in a relatively simple manner and a temperature-dependent calibration can be performed.

The present invention is explained in greater detail below on the basis of an exemplary embodiment with reference to the accompanying drawings.

Figure 1:
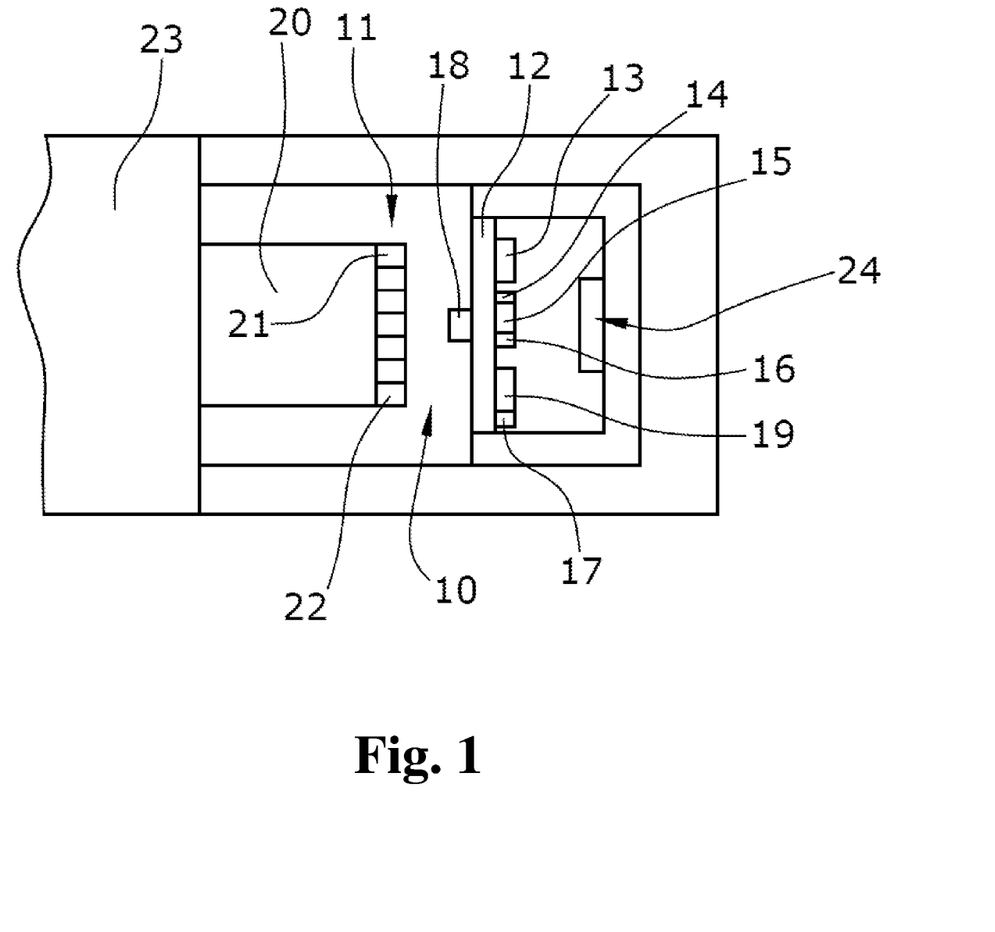
FIG. 1 schematically shows a cross-sectional view of a rotary encoder according to the present invention.

FIG. 1 shows an example of a rotary encoder 10 according to the present invention. The rotary encoder 10 is arranged at an axial end of a machine shaft 20, wherein the machine shaft 20 is here configured as a drive shaft of a drive motor 23. The rotary encoder 10 here serves to exactly control the drive motor 23 and, for this purpose, is electrically connected to a control unit 24 of the drive motor 23.

The rotary encoder 10 comprises a magnetic exciter unit 11 arranged at the free end of the drive shaft 20 and connected to the drive shaft 20 in a rotationally fixed manner. The exciter unit 11 produces a readable magnetic code track, in particular a plurality of rotational angle positions 21, 22, adapted to be captured with the aid of a plurality of permanent magnets which are arranged across the circumference (and which are not illustrated in the drawings in detail). It is generally possible to merely use a magnet configured as a dipole, wherein merely two rotational angle positions 21, 22 present across the circumference of the machine shaft are here adapted to be captured. For reading the code track, a sensor unit 12 is provided which comprises at least one sensor 18, in particular a Hall sensor. The Hall sensor 18 can be operatively connected to the permanent magnets arranged at the drive shaft 20 and thus capture the rotational movement of the drive shaft 20 for this purpose. The capturing 42, 44 of a rotational angle position 21, 22, that is the interaction of the exciter unit 11 and the sensor unit 12, can consequently be performed in a known manner.

The rotary encoder 10 is suitable for performing an automatic calibration 40 at the drive shaft 20, in particular a temperature-compensated calibration for avoiding a temperature-dependent deviation of the captured measured values. For this purpose the rotary encoder 10 in particular comprises at the sensor unit 12 a microcontroller 19, a temperature sensor 14 and a heating/cooling device 15 for actively heating 43a or for actively cooling 43b at least an area of the rotary encoder 10. The rotary encoder 10 can thereby automatically perform a calibration 40 completely independent of external devices or influences. The temperature sensor 14 is configured as a known sensor for capturing temperatures and in particular captures the temperature prevailing at the sensor unit 12. The captured temperature can be evaluated in a temperature module (not illustrated in the drawings) which may be integrated in the microcontroller 19. The heating/cooling device 15 comprises an electric wire 16 which is heated when current is applied thereto and can heat adjacent components such as the sensor 12. For calibration purposes, for example, the sensor unit 12 can therefore be set from a first temperature T1, for example, room temperature, to a higher second temperature T2 of, for example, 100° C. Due to the fact that sensor unit 12 can also be cooled by the heating/cooling device 15, even at a very high ambient temperature T1, a calibration can alternatively be performed with regard to the measured values 31.2, 32.2 present at room temperature T2.

The rotary encoder 10 comprises a calculation module 17 for calculating 45, 47a, 47b a position measured value 31.3, 32.3 and/or a deviation 35, 36 between a position measured value 31.1, 32.1, 31.2, 32.2, 31.3, 32.3 and a desired position measured value 31.0, 32.0 for at least one predefined sensor temperature T1, T2, T3. The calculation module 17 can be integrated in the microcontroller 19.

The rotary encoder 10 comprises a storage module 13 for storing 48 at least one time pattern of position measured values 31.0, 32.0, 31.1, 32.1, 31.2, 32.2, 31.3, 32.3 and/or a correction table (not illustrated in the drawings) containing deviation values 35, 36. The storage module 13 can also be integrated in the microcontroller 19.

Figure 2:
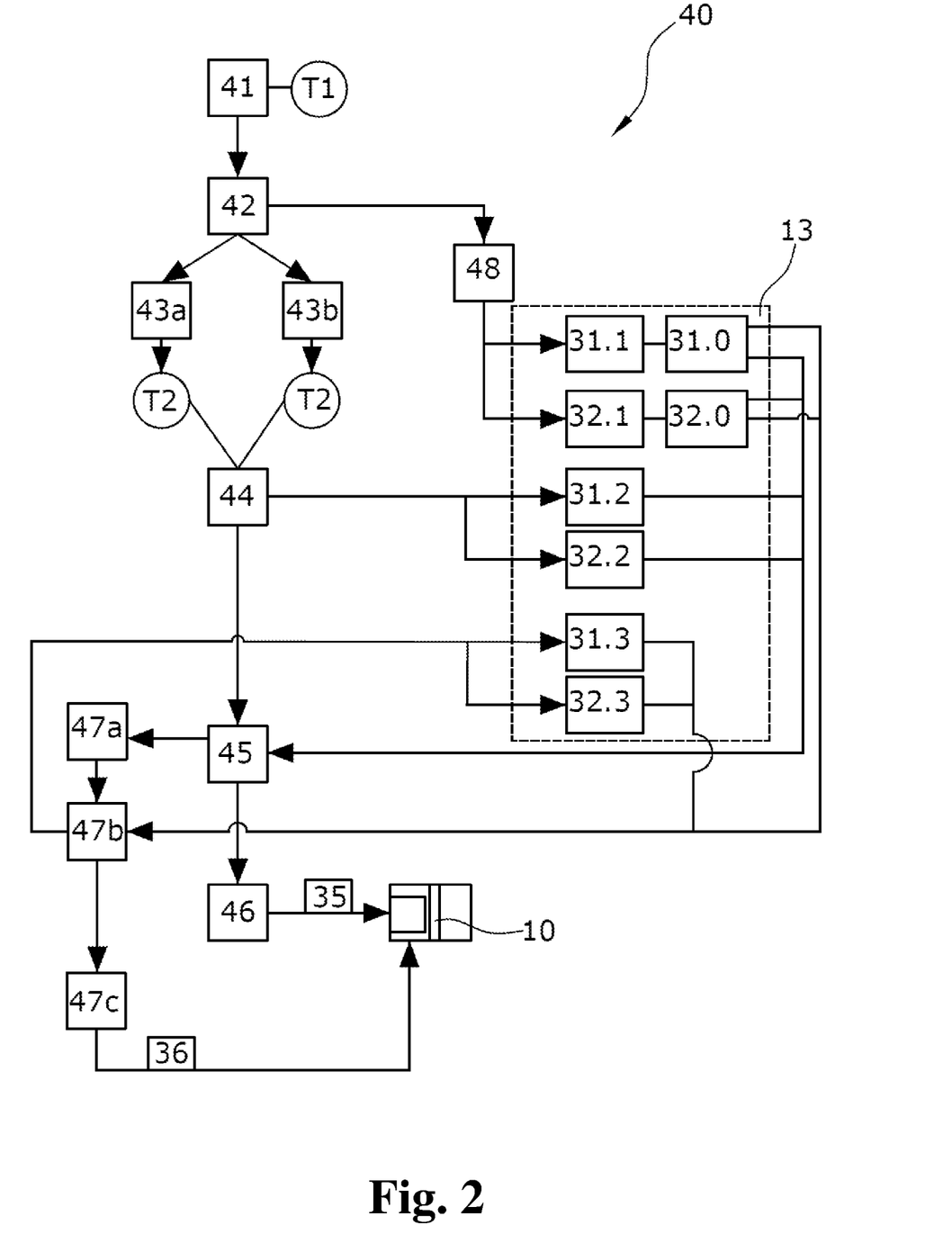
FIG. 2 schematically shows a sequence of operations of the method according to the present invention.

FIG. 2 shows the sequence of operations of the method according to the present invention for calibrating the rotary encode 10, wherein further method steps are also shown which can be performed optionally.

First, the drive shaft 20 is accelerated to rotate 41 to a predefined, for example to a constant, rotational speed, in particular a rotational speed in the range of 1000 revolutions per minute. This is performed when the first sensor temperature T1 prevails.

During a first process operation of the calibration 40, a first position measured value 31.1, 32.1 is captured 42 at two predefined rotational angle positions 21, 22 when the first sensor temperature T1 prevails. The two rotational angle positions 21, 22 are generally freely selectable, but can, as in the illustrated example, be provided an angle of 180°, i.e., opposite each other as seen across the circumference, at the machine shaft 20. The first position measured values 31.1, 32.1 can be captured during a single revolution of the machine shaft 20 so that the calibration 40 can be performed very rapidly. After the first position measured values 31.1, 32.1 have been captured, they can be retrievably stored in the storage module 13, where the storing is designated by the reference numeral 48.

Depending on the provided application of the rotary encoder 10, the sensor unit 12 can now be heated 43a or cooled 43b to a second sensor temperature T2. The heating 43a or cooling 43b is performed with the aid of the heating/cooling device 15 and results in a sensor temperature T2 which is higher or lower than the first sensor temperature T1. During a regular operation, the second sensor temperature T2 may occur due to a component of the sensor unit 12, such as the microcontroller 19, a signal amplifier and/or an A/D converter, being heated.

Once the sensor unit 12 has reached the second temperature T2, further capturing 44 of position measured values is performed, in the present case a respective second position measured value 31.2, 32.2 at the two rotational angle positions 21, 22 which have been previously measured. The current capturing 44 of the second measured value is thus performed at the same rotational angle positions 21, 22 when the second sensor temperature T2 prevails. The captured second position measured values 31.2, 32.2 are again retrievably stored in the storage module 13.

In a next step, a deviation 35 is respectively determined 45 between the captured second position measured value 31.2, 32.2 and a predefined desired position measured value 31.0, 32.0. The desired position measured values 31.0, 32.0 and the second position measured values 31.2, 32.2 can be retrieved from the storage module 13 therefor. The desired position measured values 31.0, 32.0 can here correspond to the first position measured values 31.1, 32.2 captured in the preceding step 42 at room temperature T1.

Subsequently, an output signal of the rotary encoder 10 is corrected 46 by the determined deviation 35 at the respective rotational angle positions 21, 22 when the second sensor temperature T2 prevails. At least the angle deviation 35 is then stored in the storage module 13 for future calculations and evaluations. At least a third position measured value 31.3, 32.3, which can be expected at the respective rotational angle position 21, 22 when a third sensor temperature T3 prevails, can optionally be additionally calculated 47a. Further, a respective deviation 36 between the calculated third position measured value 31.3, 32.3 and the predefined desired position measured value 31.0, 32.0 for the corresponding rotational angle position 21, 22 can be determined 47b and subsequently the output signal of the rotary encoder 10 can be corrected 47c by the determined deviation 36 at the respective rotational angle position 21, 22 when the third sensor temperature T3 prevails. The measured values 31.3, 32.3 to be expected can be arithmetically determined thereby, in particular for a temperature T3 ranging between the first temperature T1 and the second temperature T2, in particular by interpolating the known measured values 31.0, 32.0, 31.1, 32.1, 31.2, 32.2.

This procedure can be performed within a few revolutions of the machine shaft 20 and/or automatically repeated by the rotary encoder 10 over a specific period of time so that a permanently high measuring accuracy of the rotary encoder 10 can be attained. It is further possible that the temperature-dependent measurement is performed several times per revolution so that a particularly exact calibration of the rotary encoder 10 is provided.

During a subsequent regular operation of the rotary encoder 10, the position measured value captured at the respective rotational angle position 21, 22 is corrected by the deviation or correction value 35, 36 stored in the storage module 13, depending on the prevailing temperature, so that a rotational angle position value corrected by the deviation 35, 36 can be transmitted to the control unit 24 for controlling and regulating the drive motor 23.

Figure 3:
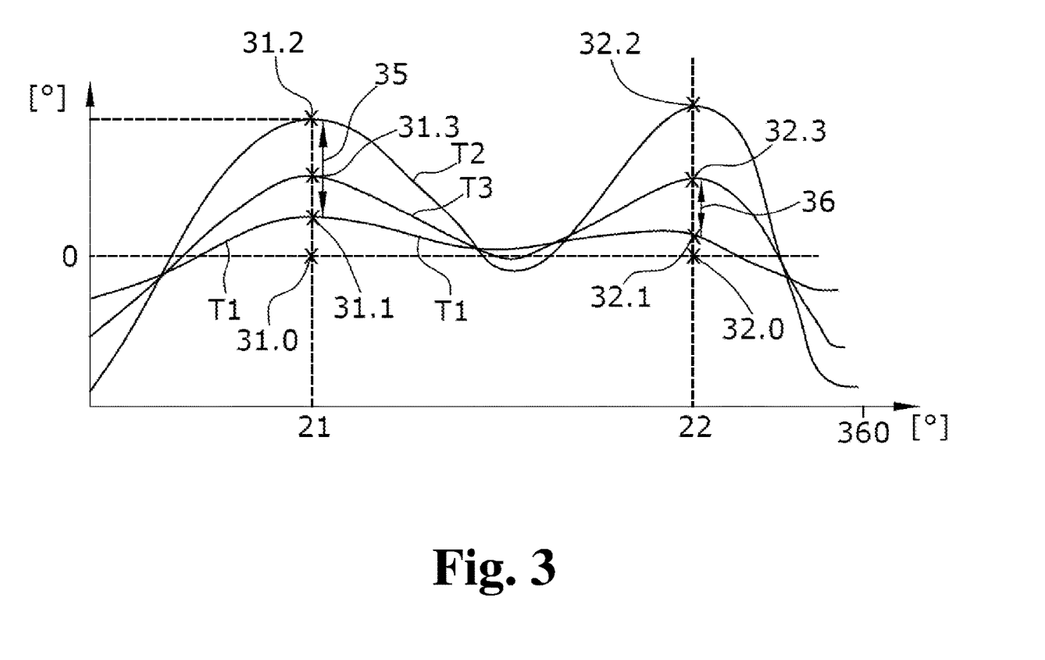
FIG. 3 schematically shows a respective captured angle progression at different temperatures.

FIG. 3 shows three exemplary angle progressions at respective different sensor temperatures T1, T2, T3. The individual position measured values are here shown across the circumference of the machine shaft 20, in particular at the presently captured rotational angle positions 21, 22. A curve passing through the desired position measured values 31.0, 32.0 shows an ideal curve of the position measured values corresponding to an indication of the actual rotational angle positions. The ideal or desired angle progression here essentially corresponds to a straight line so that no braking or jerking moments of a drive motor are taken into consideration.

The angle progression of the first position measured values 31.1, 32.1 captured at a first sensor temperature T1, in particular a temperature of approximately 21° C., shows only a slight deviation from the ideal curve. The angle progression of the second position measured values 31.2, 32.2 captured at a second sensor temperature T2, in particular a strongly increased temperature, shows a relatively strong deviation 35 from the angle curve captured at the room temperature T1. A third angle progression shows the third positon measured values 31.3, 32.3 determined at a third sensor temperature T3 which ranges between the first sensor temperature T1 and the second temperature T2, and which are in particular arithmetically determined. For a specific temperature T3 prevailing at the sensor unit 12, the required deviation 36 of the captured position measured values can be detected and a corresponding correction of the output signal of the rotary encoder 10 can be performed.

a rotary encoder with a particularly high accuracy at different temperatures prevailing at the sensor unit can thereby be provided for each individual system. It should be appreciated that the rotary encoder according to the present invention is not limited to the exemplary embodiment shown here but may be suitably designed for application in different temperature ranges. Reference should also be had to the appended claims.

LIST OF REFERENCE NUMERALS

10 Rotary encoder
11 Exciter unit
12 Sensor unit
13 Storage module
14 Temperature sensor
15 Heating and/or cooling device
16 Electric wire
17 Calculation module
18 Hall sensor, AMR sensor
19 Microcontroller
20 Machine shaft
21 First rotational angle position
22 Second rotational angle position
23 Drive motor
24 Control unit
31.0 Desired position measured value
32.0 Desired position measured value
31.1 First position measured value
32.1 First position measured value
31.2 Second position measured value
32.2 Second position measured value
31.3 Third position measured value
32.3 Third position measured value
35 Deviation
36 Deviation
40 Calibration
41 Rotation of machine shaft
42 Capturing of position measured value
43a Heating
43b Cooling
44 Capturing of position measured value
45 Determination of deviation
46 Correction of the output signal
47a Calculation of position measured value
47b Determination of deviation
47c Correction of the output signal
48 Storing

What is claimed is:

1. A method for calibrating a rotary encoder for capturing a rotational angle position of a machine shaft,
wherein the rotary encoder comprises:
at least one exciter unit connected to the machine shaft in a rotationally fixed manner; and
a stationary sensor unit which is configured to functionally interact with the exciter unit,
the method comprising:
initiating a rotating of the machine shaft so as to perform a rotational movement at a predefined constant rotational speed;
heating or cooling at least the stationary sensor unit to a calibration sensor temperature which is higher or lower than an initial sensor temperature;
capturing a calibration angle progression at the calibration sensor temperature;
determining a deviation between a rotational angle position value of the calibration angle progression and a target rotational angle position value for every rotational angle position of the calibration angle progression; and
correcting an output signal of the rotary encoder via the determined deviations when the calibration sensor temperature exists.

2. The method as recited in claim 1, further comprising:
calculating an expected angle progression which is expected to be captured at a second calibration sensor temperature;
determining an expected deviation between a rotation angle position value of the calculated expected angle progression and a target rotational angle position value for every rotational angle position of the calculated expected angle progression; and
correcting the output signal of the rotary encoder via the determined expected deviations when the second calibration sensor temperature exists.

3. The method as recited in claim 2, wherein,
the rotary encoder further comprises a storage module, and
the method further comprises:
storing at least one of,
the rotational angle position values of the calibration angle progression,
the rotational angle position values of the calculated expected angle progression,
the target rotational angle position values, the deviations, and
the expected deviations,
in the storage module.

4. The method as recited in claim 1, wherein, prior to the heating or cooling of the stationary sensor unit to the calibration sensor temperature, the method further comprises:
capturing an initial angle progression at the initial sensor temperature,
wherein,
the target rotational angle position values are determined via rotational angle position values of the initial angle progression.

5. The method as recited in claim 1, wherein,
the rotary encoder further comprises a storage module, and
the method further comprises:
determining the target rotational angle position values with a reference value encoder; and
storing the target rotational angle position values in the storage module.

6. The method as recited in claim 1, further comprising:
continually capturing a sensor temperature when operating the rotary encoder.

7. The method as recited in claim 6, wherein the sensor temperature is at least one of the initial sensor temperature, the calibration sensor temperature, and the second calibration sensor temperature.

* * * * *